Nov. 30, 1965     G. P. TOUEY ETAL     3,220,904
METHOD OF MAKING A RIGID FILTER FOR CIGARETTES
Original Filed May 23, 1960     3 Sheets-Sheet 1

GEORGE P. TOUEY
ROBERT C. MUMPOWER, II
INVENTORS

ATTORNEYS

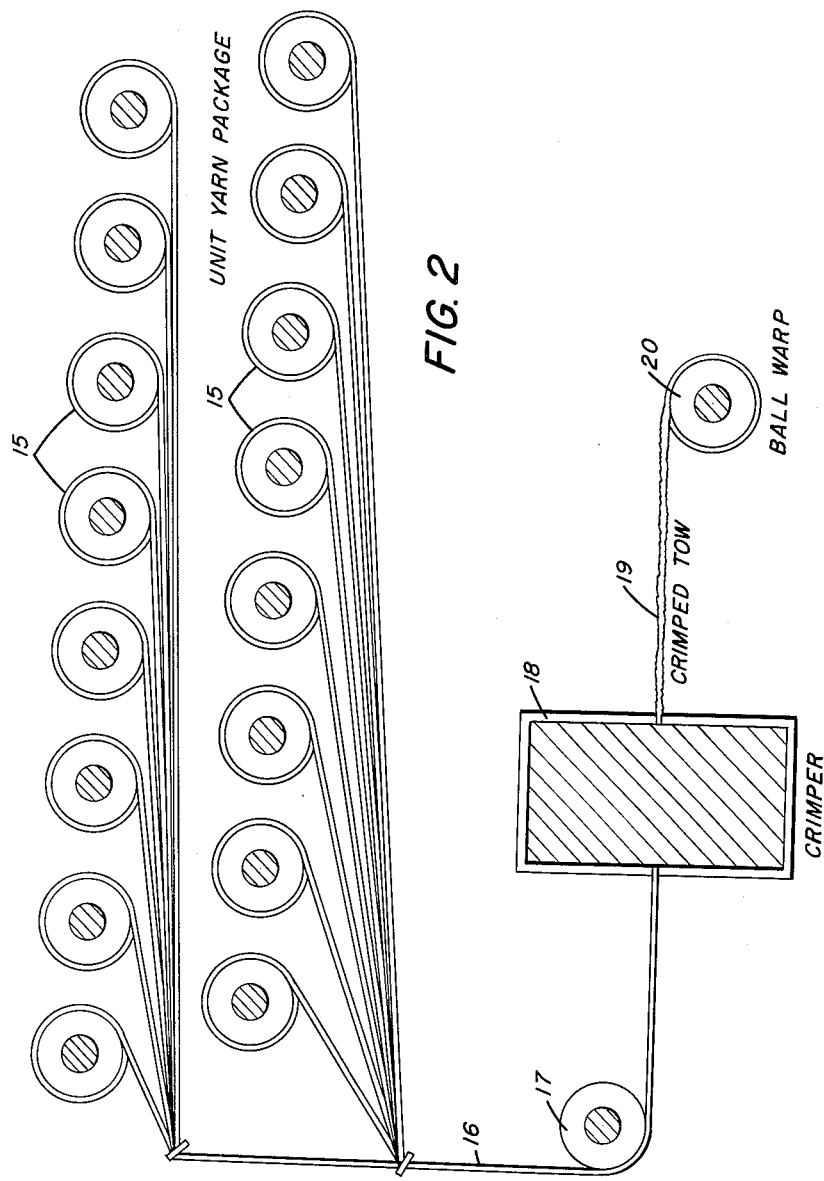

Nov. 30, 1965  G. P. TOUEY ETAL  3,220,904
METHOD OF MAKING A RIGID FILTER FOR CIGARETTES
Original Filed May 23, 1960  3 Sheets-Sheet 3

GEORGE P. TOUEY
ROBERT C. MUMPOWER, II
INVENTORS

BY
ATTORNEYS

United States Patent Office 3,220,904
Patented Nov. 30, 1965

3,220,904
METHOD OF MAKING A RIGID FILTER FOR CIGARETTES
George P. Touey and Robert C. Mumpower II, both of Kingsport, Tenn., assignors to Eastman Kodak Company, Rochester, N.Y., a corporation of New Jersey
Original application May 23, 1960, Ser. No. 30,916, now Patent No. 3,038,478, dated June 12, 1962. Divided and this application Jan. 18, 1962, Ser. No. 168,576
4 Claims. (Cl. 156—167)

This application is a division of Serial No. 30,916 now U.S. Patent No. 3,038,478 of June 12, 1962.

This invention relates to a new and improved method for producing a firm or rigid fibrous filter for cigarettes. More particularly, it relates to a method for producing a firm or rigid cigarette filter from a crimped continuous filament tow of poly-α-olefin filaments.

A wide variety of fibrous materials have been recommended as filter media for cigarette smoke. One type which has gained rather widespread acceptance by the trade is a filter prepared from a crimped textile tow of cellulose acetate fiber as described in U.S. Patent 2,794,239. This material has several attributes which have made it highly acceptable to the filter trade. Two of the most important of these attributes are the ease and rapidity at which such a textile tow can be continuously processed into filter rods on standard filter-making equipment. The other is the fact that a cellulose acetate tow can be bonded into rigid filters by applying a non-volatile liquid organic plasticizer to its surface on the filter-making machine just prior to the rod-forming and paper-wrapping step. The plasticizer, which is sprayed on the tow as fine droplets, gradually dissolves those points on the fibers which it touches making an adhesive area capable of bonding adjacent fibers in the tow in a random manner. This random fusing of the fibers at various points throughout the filter produces the proper rigidity needed to cut the rod into filter tips. Such an operation which employs a non-tacky type of bonding agent that bonds the fibers gradually and after they are in the form of a filter has obvious advantages over the application of conventional adhesives. Conventional adhesives produce a tacky surface on the tow immediately after their application. This causes the tow to adhere to the various parts of the machinery during the fabrication of the filter rod.

Although a cellulose acetate tow has several processing advantages over other types of fibrous materials which have been recommended for cigarette filters, it also has certain limitations. For example, cellulose acetate fibers are inherently weak (1.0–1.2 g./denier) compared with the commercial synthetic fibers. This limits the amount of crimp which can be given to a tow of cellulose acetate fibers and also limits the amount of tension that can be applied to it on the filter rod make-up machine. Also, cellulose acetate filaments cannot be drafted appreciably to form finer fibers during or after spinning. This limits the fineness of the fiber diameter which can be produced. As an illustration, the limiting size of a cellulose acetate filament which can be manufactured by conventional techniques is in the order of 1.5 to 2.0 denier per filament. Highly draftable synthetic fibers, on the other hand, can be readily produced in sizes of 1 denier per filament or less and it is well known to the cigarette filter art, in general, that the finer the fiber the more effective is its filtering efficiency.

In the copending Touey et al. U.S. patent applications Serial No. 664,157, filed June 7, 1957, and now Patent No. 2,966,157, entitled, "Polyolefin Tobacco Smoke Filters," and Serial No. 827,164, filed July 15, 1959, entitled, "Bonded Tobacco Smoke Filters," there is described new types of crimped textile tow material which have certain advantages over a cellulose acetate tow type of filter material. It is a highly crimped tow of polyolefin fibers. Due to the inherent high strength and draftability of these filaments, it was possible to produce finer denier tows having a high degree of crimp and a high degree of tensile strength. Also, disclosed in these applications is the discovery that highly crimped tows of these polyolefins produce more effective filters than tows of cellulose acetate which, due to their inherent weakness, cannot be given a high degree of crimp.

While such polyolefin tows have several advantages over cellulose acetate tows, they also have some disadvantages. These stem mainly from the fact that unique method of bonding a cellulose acetate tow into a hard filter rod by means of a non-volatile liquid organic plasticizer cannot be employed with polyolefins tows. This is because the conventional organic plasticizers will not dissolve polyolefins fibers which are quite inert to most organic liquids. To circumvent this problem, several methods for producing from filter rods from polyolefin tows are discussed in the above-mentioned application Serial No. 827,164. However, these methods, such as using a heavier paper wrapper or heat fusing the polyolefin fibers require changes in the commerical filter-making operation or equipment. This is often undesirable since, due to the established use of cellulose acetate tow as a cigarette filter material, the industry has more or less standardized its filter processing machinery and techniques. For example, a heat fusing apparatus would have to be installed on the filter rod machine. If a heavier filter rod paper wrapper were used, a more effective glueing system for sealing such a heavy wrapper around the filter would be required.

In view of these additional requirements for manufacturing polyolefin filters, a filter rod manufacturer might consider that such changes to his established filter-making technique or machinery were too expensive to warrant replacing cellulose acetate tow with a polyolefin tow.

The instant invention enables polyolefin tows to be competitive in these respects.

One object of this invention is to provide a method for modifying the fibers of a crimped continuous filament polyolefin tow so that the more conventional liquid non-volatile organic plasticizer application technique used in producing rigid cellulose acetate tow filters can be used in making rigid polyolefin tow tobacco smoke filters. Another object is to provide a crimped polyolefin tobacco smoke filter which does not require heat fusion to produce firmness or rigidity. A third object is to eliminate the necessity of using a heavy paper wrap to produce a filter rod with sufficient rigidity that it can readily be cut into smaller segments (filter tips). Other objects will appear hereinafter.

These objects are accomplished by incorporating certain plasticizer-sensitive polymers into the polyolefin fibers during the melt-spinning operation. In this way, the fibers, when converted to a crimped tow, are slowly and partially solvated by the applied plasticizer after the filter rod fabrication. This produces an adhesive surface at random spots throughout the filter after it has been prepared. These spots fuse together (after the filter is stored for a short length of time) producing the desired firmness throughout the filter rod. Such rigidity or firmness is required for the efficient cutting of the filter rod and is also desirable from the smoker's standpoint.

*Type of plasticizer sensitive organic polymers.*—The plasticizer sensitive polymers which can be incorporated into the polyolefin must meet certain requirements as here-in outlined. They must be flowable, substantially non-volatile, liquids within the temperature range of 200–350° C. This is the temperature range normally employed in melt-spinning polyethylene and polypropylene fibers. They must be either compatible or highly dispersible in the melted (200–350° C.) polyolefin during the continuous filament melt-spinning operation. They must not decompose to any appreciable extent during the melt spinning operation. Normally, this means that they must be capable of withstanding melt temperatures of at least 200° C. for 1 to 10 minutes. They must be soluble in a liquid high-boiling organic plasticizer chosen from one of the types specified below. Finally, they must have a molecular weight between 500 and 100,000 and preferably between 500–50,000, so that they will not impart an excessively high viscosity to the melted spinning mixture. The following classifications of organic polymers are satisfactory additives for the polyolefin fibers:

(I) Polyacrylate and polymethacrylate esters of saturated aliphatic alcohols, the alcohols containing only 1 hydroxyl group and 1 to 18 carbon atoms. Examples: Methyl, ethyl, propyl, isobutyl, hexyl, octyl and stearyl acrylates or methacrylates.

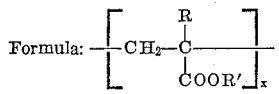

$R = H$ or $CH_3$
$R' = C_nH_{2n+1}$ where $n = 1–18$.

(II) Polystyrene.

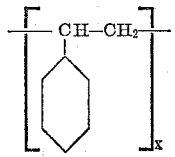

(III) Polyvinyl esters of saturated aliphatic acids, the acids containing only 1 carboxyl group and 2 to 18 carbon atoms. Examples: Acetic, propionic, butyric, isobutyric, valeric, 2-ethyl hexanoic and stearic acid esters of polyvinyl alcohol.

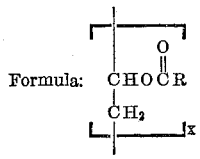

$R = C_nH_{2n+1}$ wherein $n = 1–18$.

(IV) Polyvinyl acetals of saturated aliphatic aldehydes containing only 1 carbonyl group. Examples: Polyvinyl acetal, polyvinylpropional, polyvinylbutyral.

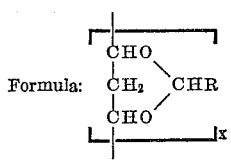

$R = C_nH_{2n+1}$ where $n$ is H, $CH_3$, $C_2H_5$, $C_3H_7$.

(V) Polyesters of saturated dibasic acids and saturated aliphatic dihydric alcohols. Examples of dibasic acids are phthalate, isophthalic and terephthalic acids, succinic acid, glutaric acid, adipic acid, pimelic acid, and azelaic acid. Examples of diols are ethylene glycol, diethylene glycol, triethylene glycol, propylene glycol, dipropylene glycol, tripropylene glycol, butylene glycol, neopentyl glycol and cyclohexanedimethanol.

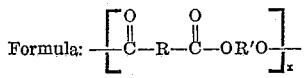

(VI) Polymerized nopinene.

Formula of nopinene: 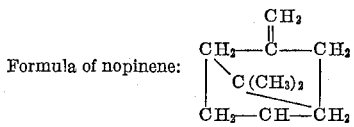

(VII) Cellulose esters of monocarboxylic aliphatic acids. Examples: Cellulose acetate, cellulose acetate propionate, cellulose propionate, cellulose butyrate, cellulose acetate butyrate, cellulose propionate butyrate, cellulose valerate, cellulose caprate.

Formula: 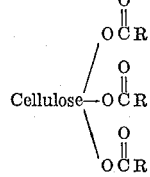

$R = C_nH_{2n+1}$ where $n = 1–10$.

It is understood that the types of polymers listed above need not be pure homopolymers. Thus, they can be copolymers produced from two or more vinyl monomers or they can be heteropolyesters from mixtures of dibasic acids or dihydric alcohols. However, they must meet the physical and chemical requirements as stated above.

The amount of plasticizer-sensitive polymer which must be incorporated into the polyolefin fibers to produce a plasticizer sensitive cigarette filter tow will vary according to their molecular weight and chemical formula. In general, however, it should be present in the final fiber at a concentration range of 15 to 50%. The preferred concentration of plasticizer-sensitive polymer additive is 25 to 50%.

*Type of plasticizer bonding agent.*—The organic plasticizer which is suitable for producing a gradual bonding of the modified polyolefin tow fiebrs within the filter must at least be a partial solvent for the additive polymer at room temperature. It must also be a liquid with a negligible vapor pressure at room temperature and boil above 200° C. at atmospheric pressure (760 mm.). This high-boiling property of the bonding liquid is one of the critical features of the invention since it has many commercial advantages over the use of volatile bonding agents. For one, it leaves no residual odor in the finished filter. Also, since the bonding agent does not evaporate from the filter, there is no solvent loss encountered during the filter-making operation. This is very desirable since organic solvent losses would present safety hazards as well as cost problems to the filter manufacturer.

One class of organic plasticizers which meets the requirements outlined above for a suitable bonding liquid for the modified polyolefin tow consists of liquid high-boiling organic esters prepared by esterifying mono-, di- and tricarboxylic acids with alcohols, glycerine or glycols. Examples of liquid organic acid ester type plasticizers are diethyl phthalate, dibutyl phthalate, dioctyl phthalate, dimethoxyethyl phthalate, dibutyl sebacate, triethyl citrate, tributyl citrate, ethylene glycol, di-2-ethylhexanoate, glycerol triacetate, diisobutyl adipate, and dioctyl azelate.

Another class of organic plasticizers are the water insoluble polypropylene glycols and the polybutylene glycols.

A fourth class of organic plasticizers are the high, medium and heavy-bodied mineral oils.

The amount of plasticizers required to produce a filter rod of sufficient firmness for satisfactory cutting and handling can vary with the type of plasticizer and the types of plasticizer polymer used. Too much plasticizer is to be avoided since it will have a tendency to stain the paper wrapper. In any event, the minimum plasticizer content should not be below 5% and the maximum should not be above 20%. The preferred range of plasticizer content in the filter is 8–16%.

Essentially, therefore, we have found a method for adjusting a crimped polyolefin tow filter so that it can be hardened with an organic plasticizer in the manner that a filter of crimped cellulose acetate tow is hardened. The method consists of adding plasticizer-soluble polymers to the polyolefin at the time it is melt spun into filbers, producing a crimped tow from such fibers and spraying the tow with a liquid organic plasticizer, as it is being converted to a cigarette filter rod.

*Spinning of the modified polyolefin fibers.*—In general, it is not necessary to melt blend the polyolefin with the modifying polymer prior to melt spinning. Quite satisfactory results were obtained simply by blending the two materials in granular or powder form and then continuously feeding this blend to the melting chamber of the melt spinning apparatus. However, if desirable, the two polymers can be preblended by melt mixing them together and allowing the melt to solidify. This solid can then be granulated before being fed to the melting chamber of the spinning apparatus.

The exact process and equipment used for melt spinning the modified polyolefin material into filaments is not a limitation on the present invention. Any of the methods known in the textile industry for preparing continuous melt-spun polyolefin filaments may be used for preparing the filaments of the present invention provided that a suitable denier is obtained.

*Crimping of the modified polyolefin fibers.*—As previously mentioned, a high degree of crimp (i.e., 16–40 crimps per inch) is desirable in the filter tow prepared from the modified polyolefin fibers of this invention. However, if it is desirable to make filters similar to cellulose acetate tow filters lower amounts of crimp (say 10–16) can be employed. By crimps per inch we mean the number of convolution per inch of fiber length. By amplitude of crimps we mean the height of each convolution.

There are various types of crimping apparatus that may be used. Examples of satisfactory crimping devices are described in the following U.S. patents: 2,090,669; 2,311,174; 2,505,618; 2,698,970; 2,734,228; 2,734,229; 2,734,251; 2,740,992 and 2,749,233. Most of the commercial crimping devices for textile tows are of the "stuffing box" type, although in some instances, the "gear" type is used. Both of these types are discussed in the patents listed above. We prefer the "stuffing box" type since it readily permits putting in a range of crimp from about six crimps per inch up to, for example, 40 crimps per inch of an amplitude between 0.10 inch and 0.01 inch.

*Type of polyolefin material.*—The polyolefin material preferably has a molecular weight of 10,000 and 100,000. Preferably, its molecular weight is between 20,000 and 75,000. Its softening point is between 85 and 160° C. Of the several polyolefins produced industrially, we prefer the polyethylenes and polypropylenes, the structural repeating units of which are as follows:

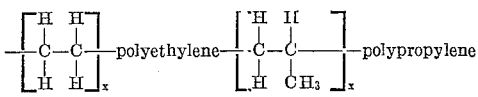

The present invention is further illustrated in the following examples.

*Example 1.—Filter fibers from a melt mixture of polypropylene and polymethyl methacrylate*

A well-blended granular mixture of 50 parts polymethyl methacrylate (molecular weight 15,000) and 50 parts polypropylene (molecular weight 32,000) was continuously fed to a heating chamber which melted and heated it to a homogeneous solution at a temperature of 235° C. After an exposure time of approximately 2 minutes in the heating chamber, the melted solution was forced through a 500-hole spinnerette with 0.30 mm. openings. The resulting continuous filaments, after drafting, were 0.8 denier per filament; they had a strength of 3.5 g. per denier and a stretch of 34%. The drafted yarn was plied into a tow of 35,000 filaments and then led through a textile crimper which produced 30 crimps per inch, all in a direction perpendicular to the length of the fibers. The crimped tow was fluffed out to a width of 12 inches and sprayed on both sides with di(methoxyethyl)phthalate until 12% of the liquid plasticizer (based on the combined weight of tow and plasticizer) had been added. It was then pulled back together into the form of a compact cord and fed into a cigarette filter rod-making machine which produced filter rods wrapped in cigarette paper. The rods were 90 mm. in length and 25.5 mm. in circumference. When first prepared, the compacted filaments in the rods were not bonded. This was easily detected by their softness and by observing how the fibers bloomed out when the paper wrapper was removed. However, after a storage time of 2 hours at room temperature, the rods were quite hard and could be easily cut into filter tips 15 mm. in length. When the paper wrapper was removed from one of these tips, the filaments within did not bloom out but retained the shape of a rod. Microscopic examination of the filter tips revealed that the parallel filaments were sealed to each other at random spots through the filter.

Some of the filters were placed on king size (85 mm.) cigarettes, shortened by 15 mm. and smoked on an automatic smoking machine. The results revealed they removed 45% more of the tars and 44% more of the nicotine from the main stream smoke than the 15 mm. of tobacco they replaced. The filter tips had an average pressure drop of 2.3 inches (water) at an air flow rate of 17.5 ml. per second. A commercial cellulose acetate filter removed from a popular brand of filter cigarettes had an average pressure drop of 2.5 inches. It removed only 28% of the tars and 27% of the nicotine when tested in a similar manner.

*Example 2.—Filter fibers from a melt mixture of polypropylene and polystyrene*

A well-blended fine granular (100 mesh) mixture of 50 parts polystyrene (molecular weight 10,000) and 50 parts polypropylene (molecular weight 32,000) was continuously fed to the heating chamber of a melt spinning apparatus which melted and heated it forming a fine dispersion of the polystyrene in the polypropylene. The temperature of the melt reached 240° C. during its exposure time (2 minutes) in the melting chamber. It was then forced through a 500-hole spinnerette with 0.3 mm. openings. The continuous filaments obtained were drafted to 1.8 denier per filament; they had a strength of 3.5 g. per denier and an elongation of 28%. The drafted yarn was plied into a tow of 20,000 filaments and then led through a textile crimper which produced 25 crimps per inch, all in a direction perpendicular to the length of the fibers. The crimped tow was fluffed out to a width of 12 inches and sprayed on both sides with diethyl phthalate until 13% of the liquid plasticizer (based on the combined weight of tow and plasticizer) had been added. It was then pulled back into the form of a compact cord and fed into the cigarette filter rod-making machine which produced filter rods wrapped in cigarette paper. The rods were 90 mm. in length and 25.5 mm. in circumference. They were soft when first prepared but became hard after a storage time of 4 hours at room temperature. After this time the paper was removed from one of the rods without causing the fibers to bloom out. Microscopic examination of this opened rod revealed that the filaments were sealed to each other at random spots throughout the filter.

Several of the firm filter rods were easily and cleanly cut into 15 mm. filters. These were placed on king-size (85 mm.) cigarettes, shortened by 15 mm. and smoked on an automatic smoking machine. The tests indicated the filters removed 34% more of the tars and 33% more of the nicotine from the main stream smoke than the 15 mm. of tobacco they replaced. The filter tips had an average pressure drop of 2.0 inches (water) at an air flow rate of 17.5 ml. per second.

*Example 3.—Filter fibers from a melt mixture of polyethylene and a polymerized nopinene (β-pinene)*

A well-blended powdered (100 mesh) mixture of 30 parts of polynopinene (Piccolyte resin S–115 Pennsylvania Industrial Chemical Corporation) and 70 parts of low density polyethylene (molecular weight 20,000) was melted (200° C.) into the form of 1-ft. square sheets of ⅛ in. thickness. The sheets were then granulated and the granules continuously fed to the heating chamber on a melt spinning apparatus which heated them for 2 minutes to a flowable melt at 230° C. This melt was then forced through a 500-hole spinnerette with 0.3 mm. openings. The continuous filaments obtained were slightly drafted to 5.0 denier per filament; they had a strength of 3.1 g. per denier and an elongation of 33%. The drafted yarn was plied into a tow of 18,000 filaments and given 32 crimps per inch. The crimped tow was fluffed out to a width of 12 inches and sprayed on both sides with a light-bodied mineral oil until 9% (based on the combined weight of tow and plasticizer) had been added. It was then pulled back into the form of a compact cord and fed into a cigarette filter rod-making machine which produced filter rods wrapped in cigarette paper. The rods were 90 mm. in length and 25.6 mm. in circumference. They were soft when first prepared but after 5 hours at room temperature, they were firm enough to be cut cleanly into filter tips of 15 mm. lengths. Microscopic examination of one of the filter tips revealed that the mineral oil (a solvent for the polynopinene resin) had bonded the filaments at random spots throughout the filter.

Some of the filter tips were tested on king-size (85 mm.) cigarettes shortened by 15 mm. The results indicated that they removed 30% more tars and 28% more nicotine from the main stream smoke than the 15 mm. length of tobacco they replaced. The filter tips had an average pressure drop of 1.7 inches (water) at an air flow rate of 17.5 ml. per second.

*Example 4.—Filter tips from a melt mixture of polypropylene and polyvinyl acetate*

Twenty-five parts of polyvinyl acetate (molecular weight 10,000) and 75 parts polypropylene (molecular weight 28,000) were melted and heated together at 190° C. While in the melted state, the combination was mixed until all of the polyvinyl acetate was intimately dispersed throughout the polypropylene. The mixture was then rapidly cooled and the solid material broken into granules of about 20–50 mesh. These granules were converted into continuous filaments by melt spinning at 225° C. The filaments, after being drafted slightly, were 8 denier per filament in size and had a tensile strength of 3.80 g. per denier and a stretch of 36%. They were plied into a tow of 8,000 filaments which was then given 20 crimps per inch.

The crimped tow was fluffed to a width of 12 inches and sprayed on both sides with glycerol triacetate until 12% (based on the combined weight of the tow and plasticizer) had been added. It was then pulled back into the form of a compact cord and fed into a cigarette filter rod-making machine which produced filter rods wrapped in cigarette paper. The rods were 90 mm. in length and 25.6 mm. in circumference. They were soft when first prepared but after 8 hours' storage time at room temperature, they were quite hard and could be readily cut into filter tips 15 mm. in length. One of the tips was opened and viewed under the microscope. This examination revealed that the tiny particles of plasticizer had been adsorbed by the polyvinyl acetate particles dispersed in the polypropylene. This, in turn, had caused these spots to adhere to polyvinyl acetate spots in adjacent fibers forming a fairly rigid network of fibers fused together at random points.

Some of the filter tips were tested on king-size (85 mm.) cigarettes shortened by 15 mm. The results indicated that they removed 15% more tars and 13% more nicotine from the main stream smoke than the 15 mm. length of tobacco they replaced. The filter tips had an average pressure drop of 1.3 inches (water) at an air flow rate of 17.5 ml. per second.

*Example 5.—Filter fibers from a melt mixture of polypropylene and polyvinylbutyral*

Thirty parts of polyvinylbutyral (Shawnigan's Butvar B–76) and 70 parts of polypropylene (molecular weight 30,000) were melted and mixed together at 190° C. When thoroughly mixed, the hot melt was continuously fed to the heated (225° C.) melt chamber of a spinning apparatus from which it was extruded through a 500-hole spinnerette. The resulting continuous filaments, after drafting, were 1 denier per filament; they had a strength of 3.2 g. per denier and a stretch of 42%. The drafted yarn was plied into a tow of 32,000 filaments and led through a textile crimper which produced 38 crimps per inch, all in a direction perpendicular to the length of the fibers. The crimped tow was fluffed out to a width of 12 inches and sprayed on both sides with di-(methoxyethyl) phthalate until 15% of the plasticizer (based on the combined weight of tow and plasticizer) had been added. It was then pulled back together into the form of a cord and fed into a cigarette filter rod-making machine which produced filter rods wrapped in cigarette paper. The rods were 90 mm. in length and 25.5 mm. in circumference. When first prepared, the filaments within the rods were not bonded and the rods therefore were too soft to be cut cleanly. However, after a storage time of 6 hours at room temperature the rods were quite firm and could be cleanly and easily cut into filter tips 15 mm. in length. Microscopic examination of some of the opened filter tips revealed that the fibers were fused together at random points throughout the filters.

Some of the filters were placed on king-size cigarettes, shortened by 15 mm., and smoked on an automatic smoking machine. The results revealed that they removed 43% more tars and 42% more nicotine from the main stream smoke than the 15 mm. of tobacco they replaced. The filter tips had an average pressure drop of 2.3 inches (water) at an air flow rate of 17.5 ml. per second.

*Example 6.—Filter fibers from a melt of polyethylene and a polyester*

Twenty-five parts of a polyester (molecular weight 20,000) prepared from 15% dimethyl terephthalate, 35% dimethyl succinate and 50% cyclohexanedimethanol, and 75 parts high density polyethylene (molecular weight 40,000) were powdered and blended. This blend was continuously fed into the melting chamber (280° C.) of a melt spinning apparatus. The highly dispersed two-phase melt was extruded from this chamber through a 500-hole spinnerette and the resulting continuous filaments, after drafting, were 6 denier per filament; they had a strength of 4.0 g. per denier and a stretch of 32%. The drafted yarn was plied into a tow of 15,000 filaments and led through a textile crimper which produced 15 crimps per inch. The crimped tow was fluffed out to a width of 12 inches and sprayed on both sides with a liquid polybutylene glycol until 12% of the plasticizer (based on the combined weight of the tow and pasticizer) had been added. It was then pulled back together into the form of a cord and fed into a cigarette filter rod-making machine which produced filter rods wrapped in cigarette paper. The rods were 90 mm. in length and 25.5 mm. in circumference. After 24 hours' storage, the rods were rigid and could be cleanly and easily cut into filter tips 15 mm. in length.

When tested on cigarettes in the manner described in the previous examples, the filters removed 24% more of the tars and 23% more of the nicotine than the 15 mm. of tobacco they replaced. The filter tips had an average pressure drop of 1.9 inches (water) at an air flow rate of 17.5 ml. per second.

Example 7.—Filter fibers from a melt of polypropylene and cellulose tripropionate Thirty-five parts of cellulose tripropionate having an intrinsic viscosity of 0.8 were blended in powder form with 65 parts polypropylene (molecular weight 30,000). The mixture was continuously fed to the melt chamber (250° C.) of a melt spinning apparatus. The highly dispersed two-phase melt was extruded through a 500-hole spinnerette and the resulting continuous filaments, after drafting, were 3 denier per filament; they had a strength of 3.1 g. per denier and a stretch of 30%. The drafted yarn was plied into a tow of 30,000 filaments and crimped to 25 crimps per inch. The crimped tow was fluffed out to a width of 12 inches and sprayed on both sides with triethyl citrate until 11% had been added. It was then pulled back together into the form of a cord and fed into a cigarette filter rod-making machine which produced filter rods wrapped in cigarette paper. The rods were 90 mm. in length and 25.6 mm. in circumference. After 24 hours' storage, the rods were rigid and could be cleanly cut into filter tips 15 mm. in length.

When tested on cigarettes in the manner described in the previous examples, the filters removed 33% more tars and 21% more nicotine than the 15 mm. of tobacco they replaced. The filter tips had an average pressure drop of 1.9 inches (water) at an air flow rate of 17.5 ml. per second.

The apparatus and method for melt spinning continuous filaments in accordance with the present invention is shown schematically in the drawings in which:

FIG. 2 is a schematic view showing the combining (plying) 16 unit packages into a tow, a crimper for the tow and the winding of the crimped tow into a ball warp.

Figure 1:
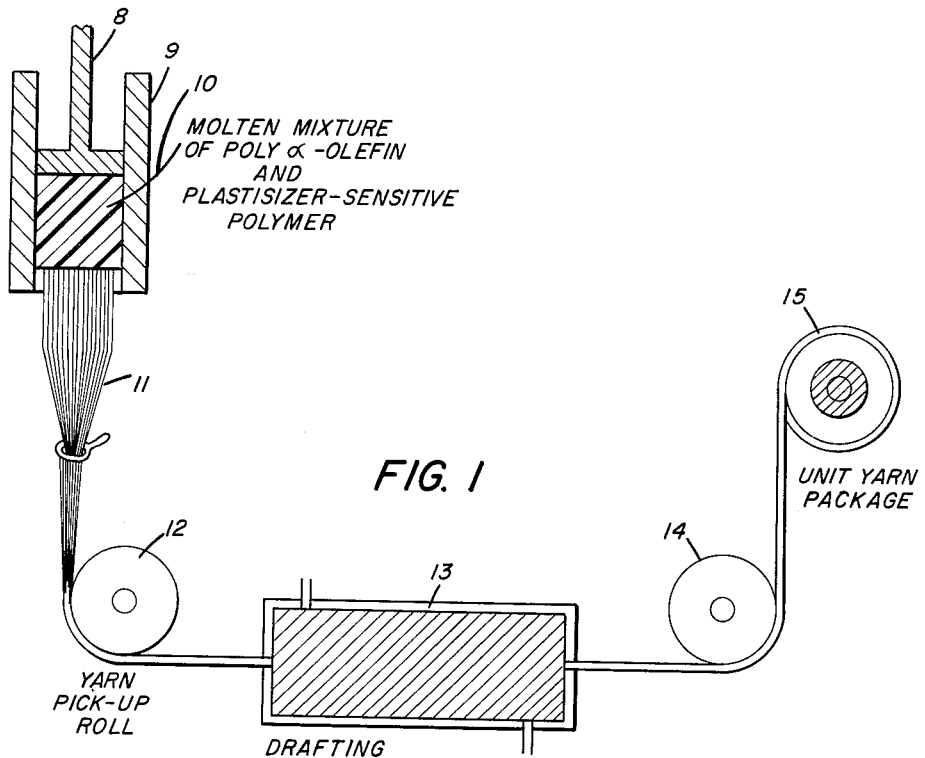
FIG. 1 is a schematic view of a melt-spinning device, which preferably has 500 spinnerette orifices, a filament drafting chamber, and a unit package of yarn which is produced from the melt-spinning device.

Referring to FIG. 1, there is shown a melt-spinning device 9 containing a mixture of a major proportion of a poly-α-olefin and a minor proportion of plasticizer-soluble polymer 10. Heat is applied by means, not shown, and the plunger 8 is then actuated to force the melt into a plurality of filaments 11 which are suitably drawn together in a strand of 500 substantially parallel filaments and conducted over roll 12 and through drafting chamber 13 where they are heated and drafted by conventional means, not shown. From the drafting chamber 13, the strand is conducted over guide roll 14 and wound into a unit yarn package 15.

Referring to FIG. 2, sixteen unit packages 15 of the spun yarn are plied into a tow 16 of 7500 filaments. This tow 16 is then passed over roll 17 and through a crimper 18 where the desired number of crimps are placed therein and finally the thus crimped tow 19 is wound into ball warp 20.

Figure 3:
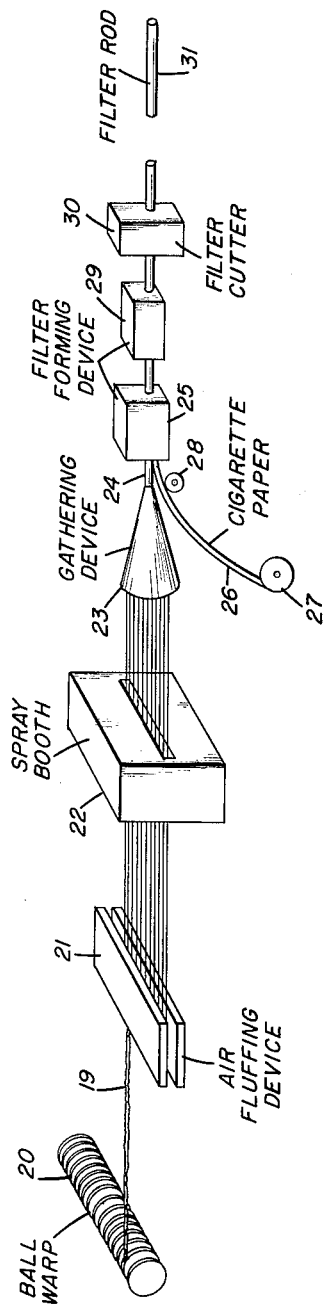
FIG. 3 is a schematic view of the apparatus for plasticizing the tow and forming it into a rigid tobacco filter plug.

Referring to FIG. 3, the crimped strand 19 is unwound from ball warp 20 and passed through air fluffing device 21 wherein the strand is spread out by air pressure into a parallel filament tow and in this spread-out parallel filament condition is conducted through spray booth 22 and sprayed with the selected plasticizer. The tow is then drawn through gathering device 23 which forms it into a round rod 24. The rod 24 passes through the cigarette paper applying device 25. The cigarette paper 26 is unwound from supply roll 27 and is conducted over roll 28 into device 25 wherein it is wrapped around the rod 24 and adhesive is applied thereto. The paper wrapped rod continues to filter forming device 29 which completes sealing the paper around the rod. Then the paper wrapped rod is cut into desired lengths to form cigarette filters 31 in cutter 30. These rods are aged for a few hours and as the plasticizer effects the plasticizer-soluble polymer component in the filaments, the rod becomes rigid.

Figure 4:
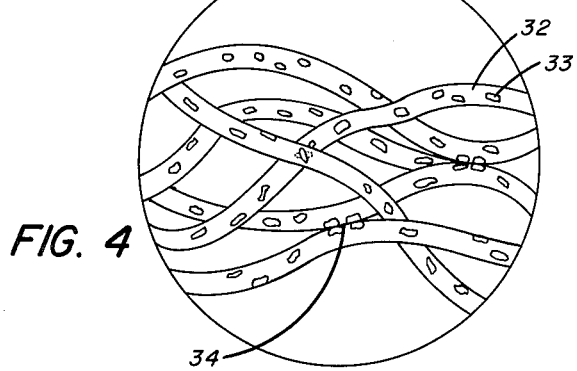
FIG. 4 is a greatly magnified view of some filaments in the tobacco filter made in accordance with the present invention.

Referring to FIG. 4, a few of the filaments in the tobacco filter are shown greatly magnified as through the lens of a microscope. The polyolefin portion of the filament is designated by 32 and the dispersed plasticizer-soluble polymer is designated by 33. The adjacent filaments are shown coalesced together at 34 which is caused by the plasticizer action on adjacent areas of the plasticizer-soluble polymer 33.

As is now apparent, our invention permits the plasticizer-bonding technique to be employed with polyolefin tows thereby enabling polyolefin tows to be employed efficiently in cigarette filters without substantially changing present filter-making machinery or paper thickness.

We claim:

1. A method of manufacturing tobacco smoke filters from poly-α-olefin compositions which comprises mixing a plasticizer-soluble polymer into the poly-α-olefin, spinning the mixture into filaments, forming a tow from a multiplicity of said filaments, and spraying the tow with an organic plasticizer, forming the tow into a filter rod, and rigidifying the filter rod at room temperature for a period of 4 to 24 hours to promote plasticizing of the plasticizer-soluble polymer whereby the filter rod becomes rigid.

2. A method of manufacturing tobacco smoke filters from poly-α-olefin compositions including polyethylene and polypropylene compositions which comprises mixing a plasticizer-soluble polymer into the poly-α-olefin, melt spinning the mixture into filaments, forming a tow from a multiplicity of said filaments, crimping said tow with from 16 to 40 crimps per linear inch of tow, spraying the crimped tow with a liquid organic plasticizer selected from the group consisting of di(methoxyethyl)phthalate, diethyl phthalate, glycerol triacetate, triethyl citrate, polybutylene glycol, and rigidifying the filter rod at room temperature for a period of 4 to 24 hours.

3. The method of claim 2 including an additional step in which the circumferential portion of filter rod is wrapped and sealed in filter paper prior to the rigidifying step.

4. The method of claim 2 in which the tow is one having from 8000 to 35,000 filaments.

References Cited by the Examiner
UNITED STATES PATENTS

| | | |
|---|---|---|
| 2,900,988 | 8/1959 | Crawford et al. |
| 3,017,309 | 1/1962 | Crawford et al. |
| 3,079,930 | 3/1963 | Cobb et al. |

EARL M. BERGERT, *Primary Examiner.*